Aug. 14, 1951 A. W. KEIGHT ET AL 2,563,937
MIXING APPARATUS
Filed Sept. 10, 1949
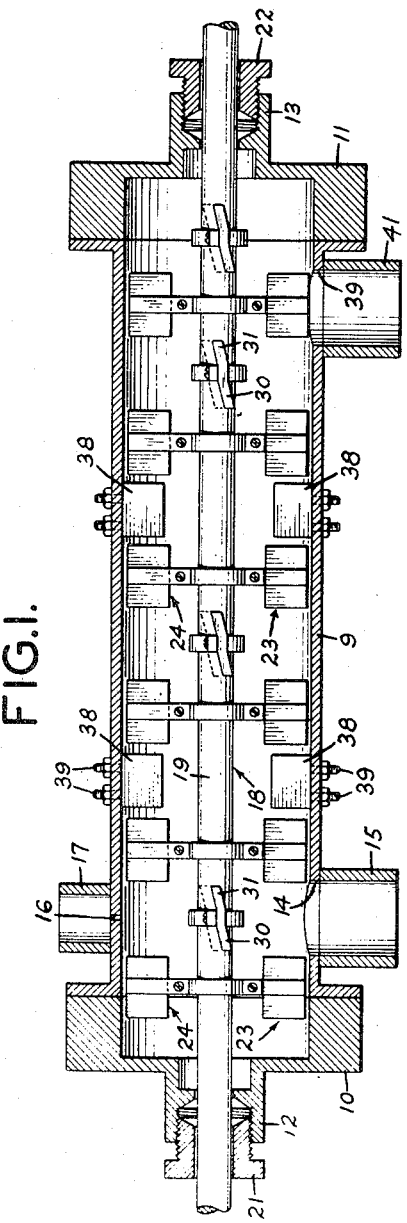
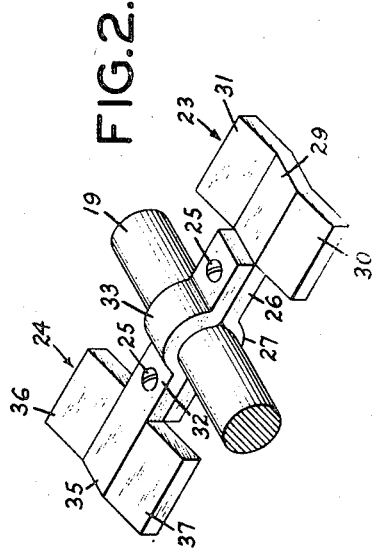
INVENTORS.
ALBERT W. KEIGHT
GEORGE F. BOTTORF
BY
ATTORNEYS.

Patented Aug. 14, 1951

2,563,937

UNITED STATES PATENT OFFICE 2,563,937

MIXING APPARATUS

Albert W. Keight and George F. Bottorf, Cumberland, Md., assignors to Celanese Corporation of America, New York, N. Y., a corporation of Delaware Application September 10, 1949, Serial No. 115,028

2 Claims. (Cl. 259—9)

This invention relates to mixing apparatus and relates more particularly to mixing apparatus for blending a plurality of liquid materials at least one of which has a high viscosity.

In the preparation of organic acid esters of cellulose, it is customary to esterify a cellulosic material, preferably after a pretreatment to increase its reactivity, with an organic acid anhydride in the presence of sulfuric acid and an organic acid solvent for the ester being formed. Upon completion of the esterification, there is obtained a viscous solution, or dope, of the cellulose ester dissolved in the organic acid. A sufficient quantity of water is added to this dope to convert any remaining organic acid anhydride to the corresponding acid, and the cellulose ester, preferably after the addition of a further quantity of water to the dope and the neutralization with an alkaline material of at least a portion of the sulfuric acid, is permitted to hydrolyze or ripen to impart the desired characteristics thereto. Heretofore, it has been the practice to carry out the ripening over a period of several hours on a batch basis, in which case no difficulty was experienced in adding the water and alkaline material to the dope despite the extremely high viscosity of the latter. However, in carrying out the ripening in a continuous manner and in a shorter period of time, it was found that with ordinary mixing apparatus the alkaline material was not distributed with sufficient rapidity and uniformity through the viscous dope, and that this slowness and non-uniformity resulted in the formation of lumps in the dope and the production of a ripened cellulose ester that was not constant in its properties.

It is an important object of this invention to provide a mixing apparatus which will be free from the foregoing and other disadvantages and which will be especially simple in construction and efficient in use.

A further object of this invention is the provision of a mixing apparatus for blending rapidly and uniformly a plurality of liquid materials.

Other objects of this invention together with certain details of construction and combinations of parts will be apparent from the following detailed description and claims.

A preferred embodiment of our invention will now be described in connection with the accompanying drawing wherein, Fig. 1 is a view in cross-section showing the general arrangement of the mixing apparatus, and Fig. 2 is a view in perspective showing the paddle blades employed in the mixing apparatus shown in Fig. 1.

Referring now to the drawing, the reference numeral 9 designates a flanged tubular shell which is closed at its ends by means of plates 10 and 11 that have internally threaded necks 12 and 13 located centrally thereof. Adjacent one end, the tubular shell 9 is provided with an opening 14 through which the dope to be treated is entered under pressure into said shell from a conduit 15. Adjacent the same end and at a point diametrically opposed to the opening 14, the tubular shell 9 is provided with an orifice 16 having a cross-sectional area substantially smaller than that of the opening 14, through which orifice 16, an alkaline material for neutralizing at least a portion of the sulfuric acid in the dope is fed under pressure into the tubular shell 9 from a conduit 17.

As the dope and alkaline material flow under pressure through the tubular shell 9, they are rapidly and uniformly blended by means of a paddle blade stirrer, indicated generally by reference numeral 18, which is rotated by any suitable means (not shown). The paddle blade stirrer 18 comprises a shaft 19 extending axially of the tubular shell 9 and mounted in bearings 21 and 22 that are in threaded engagement with the necks 12 and 13, respectively. A plurality of paddle blades, indicated generally by reference numerals 23 and 24, are clamped to the shaft 19 in pairs by means of bolts 25. Each of the paddle blades 23 is mounted at the end of a strap 26 that is bowed at 27 to fit the shaft 10 and has its central section 29 lying in the plane of the strap 26 and its ends 30 and 31 inclined at equal and opposite angles to the plane of the strap 26. The paddle blade 24, like the paddle blade 23, is mounted at the end of a strap 32 that is bowed at 33 to fit the shaft 19 and has its central section 35 lying in the plane of the strap 32 and its ends 36 and 37 inclined at equal and opposite angles to the plane of the strap 32. The ends 36 and 37 of the paddle blade have an inclination that is reversed with respect to the inclination of the ends 30 and 31 of the paddle blade 23. As a result, when the paddle blade stirrer 18 is rotated, the paddle blades 23 and 24 tend to move the dope and alkaline material through the tubular shell 9 in opposite directions whereby a more rapid and uniform blending of the dope and alkaline material takes place. The length of the straps 26 and 32 is selected so that the clearance between the outer edges of the paddle blades 23 and 24 and the inner wall of the tubular shell 9 is very small to prevent the dope passing through said shell from remaining at any one point on the wall thereof for an extended period of time, which would cause an undesirable variation in the properties of the cellulose ester. Between every three pairs of paddle blades 23 and 24 there are positioned stationary baffles 38 extending longitudinally of the tubular shell 9 and inwardly from the walls thereof, which baffles 38 are fastened to the walls of the tubular shell 9 with bolts 39. The baffles 38 force the dope flowing near the walls of the tubular shell 9 inwardly toward the shaft 19 insuring a complete blending of all of the dope passing through said tubular shell. After being blended, the dope is discharged from the tubular shell 9 through an outlet 39 into a conduit 41.

It is to be understood that the foregoing detailed description is given merely by way of illustration and that many variations may be made therein without departing from the spirit of our invention.

Having described our invention, what we desire to secure by Letters Patent is:

1. In a mixing apparatus, the combination with a tubular shell, of a shaft extending axially of said tubular shell, a plurality of pairs of straps carried by said shaft, the straps of each of said pairs lying in substantially parallel planes, stirrer blades mounted on said straps, each of said stirrer blades having a central section lying in the plane of the strap attached thereto and having the ends thereof inclined at equal and opposite angles to the plane of said central section, and the ends of the stirrer blade on one of the straps of each pair having an inclination reversed with respect to the inclination of the ends of the stirrer blade on the other strap, the construction and arrangement of said stirrer blades being such that the material is caused to be moved through said tubular shell in opposite directions, a plurality of inlets adjacent one end of said tubular shell for entering material into said shell, and an outlet adjacent the other end of said tubular shell for discharging material from said shell.

2. In a mixing apparatus, the combination with a tubular shell, of a shaft extending axially of said tubular shell, a plurality of pairs of straps carried by said shaft, the straps of each of said pairs lying in substantially parallel planes, stirrer blades mounted on said straps, each of said stirrer blades having a central section lying in the plane of the strap attached thereto and having the ends thereof inclined at equal and opposite angles to the plane of said central section, and the ends of the stirrer blade on one of the straps of each pair having an inclination reversed with respect to the inclination of the ends of the stirrer blade on the other strap, the construction and arrangement of said stirrer blades being such that the material is caused to be moved through said tubular shell in opposite directions, a plurality of stationary baffles carried by and extending longitudinally of said tubular shell and inwardly from the walls thereof positioned between said stirrer blades, an inlet adjacent one end of said tubular shell for entering material into said shell, an orifice adjacent the same end of said tubular shell and diametrically opposed to said inlet for entering another material into said shell, and an outlet adjacent the other end of said tubular shell for discharging material from said shell.

ALBERT W. KEIGHT.
GEORGE F. BOTTORF.

REFERENCES CITED

The following references are of record in the file of this patent:

UNITED STATES PATENTS

| Number | Name | Date |
| --- | --- | --- |
| 1,161,363 | Turner | Nov. 23, 1915 |
| 1,396,740 | Ganelin | Nov. 15, 1921 |
| 1,914,459 | Reider et al. | June 20, 1933 |
| 1,941,808 | McConnaughay | Jan. 2, 1934 |

FOREIGN PATENTS

| Number | Country | Date |
| --- | --- | --- |
| 627,274 | Germany | Mar. 11, 1936 |
| 728,959 | France | July 16, 1932 |